(12) United States Patent
Colom

(10) Patent No.: US 6,386,256 B1
(45) Date of Patent: May 14, 2002

(54) CROWN REINFORCEMENT FOR A TIRE

(75) Inventor: Andre Colom, Clermont-Ferrand (FR)

(73) Assignee: Compagnie Générale des Etablissements Michelin & Cie, Clermont-Ferrand Cedex (FR)

( * ) Notice: Subject to any disclaimer, the term of this patent is extended or adjusted under 35 U.S.C. 154(b) by 0 days.

(21) Appl. No.: 09/494,130

(22) Filed: Jan. 28, 2000

Related U.S. Application Data

(63) Continuation of application No. PCT/EP98/04394, filed on Jul. 15, 1998.

(30) Foreign Application Priority Data

Aug. 1, 1997 (FR) .............................. 97 09996

(51) Int. Cl.⁷ ................................................. B60C 9/18
(52) U.S. Cl. ...................... 152/526; 152/532; 152/454; 152/538; 152/531
(58) Field of Search .................. 152/526, 527, 152/528, 531, 454, 538, 529

(56) References Cited

U.S. PATENT DOCUMENTS

| | | |
|---|---|---|
| 4,688,615 A | 8/1987 | Lee |
| 5,225,013 A | 7/1993 | Ohsawa et al. |
| 5,271,445 A | 12/1993 | Kohno et al. |
| 6,082,425 A * | 7/2000 | Colom ........................ 152/454 |
| 6,082,426 A * | 7/2000 | Colom ........................ 152/527 |

FOREIGN PATENT DOCUMENTS

FR        2744955        8/1997

OTHER PUBLICATIONS

Patent Abstracts of Japan, vol. 018, No. 526, (M–1683), Oct. 5, 1994, JP 06183207, Abstract, 1 page. (Bridgestone Corp.) (Jul. 5, 1994).
Patent Abstracts of Japan, vol. 018, No. 543 (M–1687), Oct. 17,1994, JP 06191219, Abstract, 1 page. (Bridgestone Corp.) (Jul. 12, 1994).

* cited by examiner

*Primary Examiner*—Steven D. Maki
*Assistant Examiner*—Justin Fischer
(74) *Attorney, Agent, or Firm*—Baker Botts L.L.P.

(57) ABSTRACT

A tire with radial carcass reinforcement, having a crown reinforcement embodying at least two working crown plies formed of inextensible cables, crossed from one ply to the next, forming angles of between 10° and 45° with the circumferential direction, characterized in that, in the absence of any ply formed of inextensible cables forming an angle greater than 45° with the circumferential direction, an additional, axially continuous, ply formed of undulating metallic elements oriented substantially parallel to the circumferential direction is placed radially between the working plies.

7 Claims, 1 Drawing Sheet

CROWN REINFORCEMENT FOR A TIRE

This is a continuation of PCT/EP98/04394, filed Jul. 15, 1998.

BACKGROUND OF INVENTION

The invention relates to a tire with radial carcass reinforcement anchored within each bead to at least one bead wire, and comprising a crown reinforcement formed by at least two so-called working plies, which are superposed and formed of cords or cables which are parallel to each other in each ply and crossed from one ply to the next, forming angles of at most 45° in absolute value with the circumferential direction of the tire.

Application FR 2,744,955, in order to reduce the operating temperature of a tire with radial carcass reinforcement of the "heavy vehicle" type, while having a solution which is as effective as it is economic, advocates adding to said carcass reinforcement a crown reinforcement comprising at least two working crown plies of inextensible cables, crossed from one ply to the next, forming angles of between 10° and 45° in absolute value with the circumferential direction, characterized in that, in the absence of any ply formed of inextensible cables forming an angle greater than 45° with the circumferential direction, an additional, axially continuous ply, formed of metal elements oriented substantially parallel to the circumferential direction, is placed radially between the working plies, said additional ply having an axial width at least equal to 50% of the maximum axial width $S_0$ of the carcass reinforcement, and at least equal to 1.05 times the axial width of the widest working crown ply.

In the above context, the additional ply may be formed of so-called semi-elastic continuous steel cables, that is to say cables having relative elongations at break of between 2% and 4%. These cables make it possible to obtain the level of rigidity suitable for proper distribution of the circumferential tension between the working crown plies and the additional ply. Said cables are advantageously said to be "bimodular", that is to say, having a curve of tensile stress as a function of relative elongation having gradual slopes for the low elongations and a substantially constant, steep slope for the higher elongations. The very low modulus before curing for elongations of less than 2% permits an increase in the circumferential development of the additional ply during the curing of the tire.

The additional ply may also be formed of metal cables made of steel, oriented circumferentially and cut so as to form sections of a length very much less than the circumferential length of the ply, the cuts between sections being axially offset relative to each other. Such an embodiment makes it possible, in simple manner, to impart the desired rigidity to the additional ply, whatever it may be.

The selection of elastic cables or cut cables for reinforcing the additional ply does not permit the best fatigue strength of said ply, either as a result of a reduction in the breaking load of the elastic cables, or as a result of the existence of stress concentrations in the calendering mix of the cut cables.

SUMMARY OF THE INVENTION

In order to impart better fatigue strength of the additional ply of circumferential metallic reinforcement elements, while permitting easier industrialization, the invention proposes the use, as reinforcement elements, of metallic elements which undulate in the plane of the ply. Thus the tire with radial carcass reinforcement according to the invention, having a crown reinforcement comprising at least two working crown plies of inextensible metallic reinforcement elements, crossed from one ply to the next, forming angles of between 10° and 45° with the circumferential direction, is characterized in that, in the absence of any ply formed of inextensible reinforcement elements forming an angle greater than 45° with the circumferential direction, an additional, axially continuous, ply formed of undulating reinforcement elements is placed radially between the working plies, said ply having an axial width equal to at least 50% of the maximum axial width of the carcass reinforcement, the undulations of the reinforcement elements being parallel to each other, in phase and oriented parallel to the circumferential direction, and the ratio of the rigidity per unit length of the additional ply to the total of the rigidities per unit length of the other plies of the crown reinforcement being at most 0.10.

The rigidity of extension per unit length of a ply of reinforcement elements (measured on a ply of elements which is taken from the vulcanized tire) results from the tensile force exerted in the average direction of said elements per unit of width of ply which is necessary to obtain a given relative elongation $\epsilon$, and may be expressed by the formula $R=1/p\cdot dF/d\epsilon$, R being the rigidity of the ply in question, p the pitch between elements of said ply, $dF/d\epsilon$ the derivative of the tensile force per element relative to the relative elongation, and e being equal to 0.5%, or by the formula $R=dF/d\epsilon$, $dF/d\epsilon$ then being the derivative of the tensile force per unit of length of the ply relative to the relative elongation.

Preferably the ratio of the amplitude a to the wavelength $\lambda$ of the undulations is between 4% and 15%, the amplitude a of an undulation being, by definition, measured peak-to-peak. The ratio $a/\lambda$ of between 4% and 15% makes it possible to have reinforcement elements which do not impede the shaping of the tire blank in the vulcanization mold, while permitting the obtention, after curing, mounting and inflation of the tire, of a rigidity per unit length of the crown reinforcement which is necessary and sufficient to improve the endurance of said crown reinforcement.

The reinforcement elements which undulate in the plane of the ply are preferably metallic, and better still metallic cables made of steel, which provide the additional ply with a greater fatigue strength.

Whatever the material of which the reinforcement elements are formed (cables or monofilaments), they are advantageously of greater diameter than that of the reinforcement elements, generally metallic cables made of steel, the plies of the crown reinforcement which are located radially on either side of said additional ply.

Undulating metallic elements, the average direction of which is circumferential, are elements having undulations with axes having a direction forming an angle within the range of +5°,−5° around 0° with the circumferential direction.

It is also advantageous for the additional ply to have an axial width at least equal to 1.05 times the axial width of the widest working crown ply.

One advantageous manner of using the additional ply of undulating circumferential elements, which is more particularly suitable for tires of H/S form ratio of at least 0.50, consists in imparting to the first working crown ply a meridian curvature substantially equal to the meridian curvature of the subjacent carcass reinforcement, so as to be able to arrange it parallel to said carcass reinforcement without the interposition of profiled members. The additional ply is then provided with a substantially zero curvature, being separated from the first working ply by suitable profiled members, of substantially triangular shape.

The crown reinforcement according to the invention will advantageously be finished off by a so-called protective crown ply, formed of straight elastic metal cables made of steel, oriented relative to the circumferential direction at an angle substantially equal to the angle formed by the cables of the radially outermost working crown ply, and the axial width of which is at least equal to the axial width of the radially outermost working ply.

DESCRIPTION OF THE DRAWING

The characteristics and advantages of the invention will be better understood with reference to the following description, which refers to the drawing, illustrating in non-limitative manner an example of a preferred embodiment, and in which the single

DESCRIPTION OF PREFERRED EMBODIMENT

Figure 1:
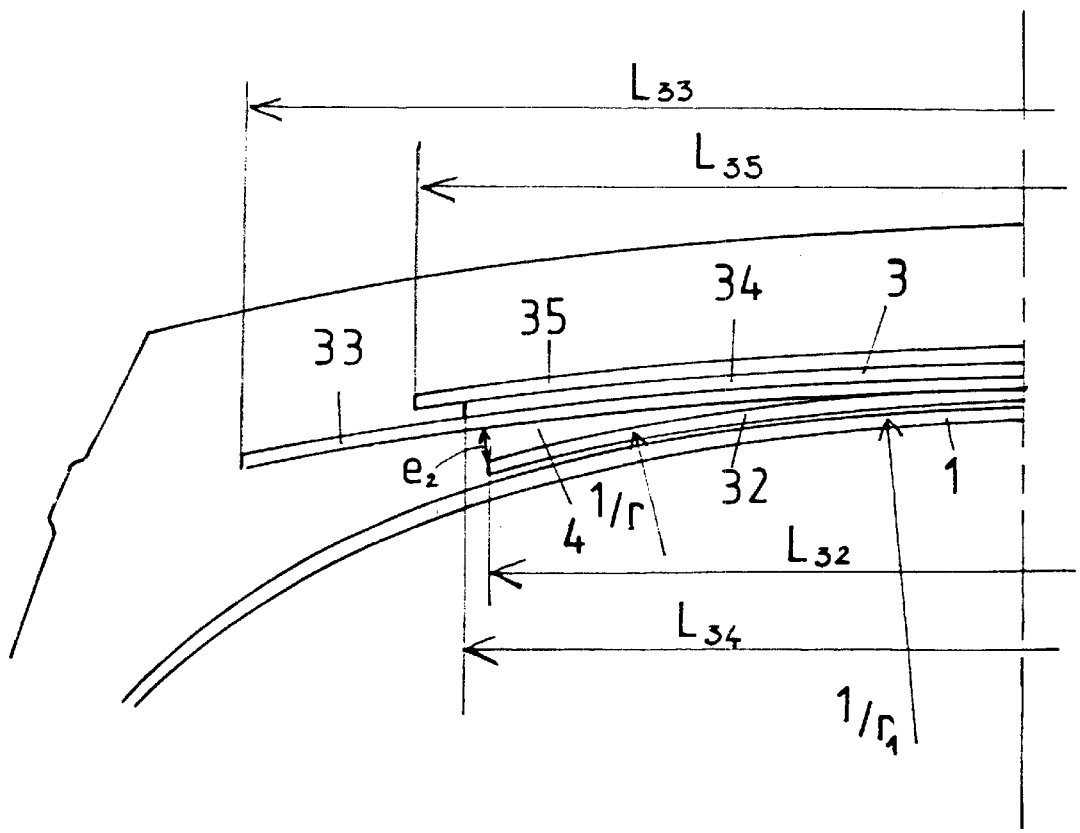
FIG. 1 shows a diagram, viewed in meridian section, of a crown reinforcement according to the invention.

The tire P, of dimension 315/80 R 22.5 X, has an H/S form ratio of 0.8, H being the height of the tire P on its mounting rim and S its maximum axial width. Said tire P comprises a radial carcass reinforcement 1 anchored in each bead to at least one bead wire, forming an upturn, and formed of a single ply of metal cables. This carcass reinforcement 1 is hooped by a crown reinforcement 3, formed radially from the inside to the outside:

by a first working crown ply 32 formed of inextensible non-hooped 14–28 metal cables made of steel, said cables having a diameter of 1.25 mm, which are parallel to each other in the ply and arranged with a pitch of 2.0 mm (measured perpendicular to said cables). They are oriented relative to the circumferential direction by an angle $\alpha$, equal in the case illustrated to 18°. Said first ply is radially adjacent and parallel to the carcass reinforcement 1, its meridian curvature 1/r being substantially equal to the meridian curvature 1/r, of the subjacent carcass reinforcement 1, the cables respectively of the carcass ply and of the working ply being separated by a constant thickness of rubber mix;

surmounting the first working crown ply 32, by an additional ply 33 formed of inextensible non-hooped metallic 27–23 cables made of steel, of a diameter of 1.4 mm and separated from each other by a pitch of 2 mm. Said cables have undulations of peak-to-peak amplitude a of 5 mm and a wavelength $\lambda$ of 100 mm, or approximately 1/30 of the circumferential length of the ply 33. Said elements are oriented at 0°, that is to say that the axes of the undulations which represent them are circumferential. The axially outer edges of the first working crown ply 32 are separated from the additional ply 33 of undulating circumferential cables by profiled members 4 of substantially triangular cross-section, the thickness $e_2$ of rubber between the ply 32 and the ply 33, measured at the axially outer end of the ply 32, being substantially equal to 2 mm.

then by a second working crown ply 34 formed of metal cables identical to those of the first ply 32, arranged with the same pitch and forming an angle $\beta$, opposed to the angle $\alpha$ and, in the case illustrated, equal to said angle $\alpha$ of 18° (but possibly being different from said angle $\alpha$), with the circumferential direction, and finally by a final ply 35 of so-called elastic metal cables made of steel, oriented relative to the circumferential direction by an angle $\lambda$ of the same direction as the angle $\beta$ and equal to said angle $\beta$ (but possibly being different therefrom), this last ply being a so-called protective ply, and so-called elastic cables being cables having a relative elongation of at least 4% at break.

The axial width $L_{32}$ of the first working ply 32 is approximately equal to 0.50 times the maximum axial width $S_0$ of the center section of the carcass reinforcement 1, namely 160 mm, which, for a tire of conventional shape, is very much less than the width of the tread, which is equal in the case in question to 235 mm. The axial width $L_{34}$ of the second working ply 34 is slightly less than the width $L_{32}$, namely 155 mm. The axial width $L_{33}$ of the additional ply 33 is substantially equal to 190 mm, which represents approximately 0.6 $S_0$. In fact, the width $L_{33}$ of the additional ply 33 is very much greater than the width $L_{32}$, $L_{34}$ of the widest working ply. The final crown ply 35, referred to as a protective ply, has a width $L_{35}$ which is slightly greater than the width $L_{34}$ of the working crown plies, namely 165 mm.

The tire thus described above was compared with tires such as described in the application referred to above, by so-called "drift" travel, the load and a transverse force being imposed on the tires inflated to their recommended pressure. Compared with a tire having the same crown reinforcement architecture, but with discontinuous metallic cables made of steel as reinforcement elements for the additional ply, the gain in terms of endurance is substantially 40% (measured in km travelled). In the same way, the gain is 20% compared with the use of continuous elastic, metallic steel cables in the additional ply. This gain is 80% compared with a tire of the same crown reinforcement architecture but without the additional ply.

I claim:

1. A tire with radial carcass reinforcement, having a crown reinforcement comprising at least two working crown plies formed of inextensible metallic reinforcement elements, crossed from one ply to the next, forming angles of between 10° and 45° with the circumferential direction, characterized in that, in the absence of any ply formed of inextensible reinforcement elements forming an angle greater than 45° with the circumferential direction, an additional, axially continuous, ply formed of undulating reinforcement elements is placed radially between the working plies, said ply having an axial width $L_{33}$ of at least 50% of the maximum axial width $S_0$ of the carcass reinforcement, the undulations of the cables being parallel to each other, in phase and oriented parallel to the circumferential direction, and the ratio of the rigidity per unit length of the additional ply to the total of the rigidity per unit length of the other plies of the crown reinforcement being at most 0.10.

2. A tire according to claim 1, characterized in that the reinforcement elements which undulate in the plane of the additional ply are metallic cables made of steel.

3. A tire according to claim 1, characterized in that the ratio of the amplitude a to the wavelength λ of the undulations of the reinforcement elements of the additional ply is between 0.04 and 0.15.

4. A tire according to claim 1, characterized in that the reinforcement elements of the additional ply are advantageously of greater diameter than that of the reinforcement elements of the working plies located radially on either side of said additional ply.

5. A tire according to claim 1, characterized in that the additional ply has an axial width $L_{33}$ at least equal to 1.05 times the axial width of the widest working crown ply.

6. A tire according to claim 1, characterized in that the first working crown ply has a meridian curvature $1/r$ substantially equal to the meridian curvature $1/r_1$ of the subjacent carcass reinforcement, such that it is arranged parallel to said carcass reinforcement, profiled members being interposed between the edges of the working ply and the additional ply, the curvature of which is substantially zero.

7. A tire according to claim 1, characterized in that the crown reinforcement furthermore comprises an axially continuous ply, referred to as a protective ply, radially located above the final working ply, formed of rectilinear elastic metallic cables, and the axial width $L_{35}$ of which is at least equal to the axial width $L_{34}$ of the radially outermost working ply.

* * * * *